United States Patent

Bardelli et al.

[11] Patent Number: 5,310,461
[45] Date of Patent: May 10, 1994

[54] COLD OXIDATION IN GASEOUS PHASE

[75] Inventors: Ernesto Bardelli, Galliate Lombardo; Eraldo Cassinerio, Ferno, both of Italy

[73] Assignee: H.R.S. Engineering S.r.l., Ferno, Italy

[21] Appl. No.: 730,839
[22] PCT Filed: Nov. 20, 1990
[86] PCT No.: PCT/IT90/00095
§ 371 Date: Sep. 6, 1991
§ 102(e) Date: Sep. 6, 1991
[87] PCT Pub. No.: WO91/07220
PCT Pub. Date: May 30, 1991

[30] Foreign Application Priority Data

Nov. 21, 1989 [IT] Italy .................. 22454 A/89

[51] Int. Cl.⁵ .................................. H05F 3/00
[52] U.S. Cl. ................................. 204/164; 204/165; 204/169; 204/170; 588/205; 588/212; 588/227
[58] Field of Search ............... 588/205, 212, 227; 204/169, 170, 164, 165; 423/240, 241, 245.1

[56] References Cited

U.S. PATENT DOCUMENTS 4,438,706  3/1984  Boday et al. ............... 110/238
4,834,962  5/1989  Ludwig ....................... 423/351

FOREIGN PATENT DOCUMENTS 8200509  2/1982  World Int. Prop. O. .

Primary Examiner—John Niebling
Assistant Examiner—C. Delacroix-Muirheid
Attorney, Agent, or Firm—Panitch, Schwarze, Jacobs & Nadel

[57] ABSTRACT

A vapour and gaseous effluent purification process wherein the gaseous flow is made to proceed between metal plates (1) subjected to oscillating electrical high voltages and then over a porous siliceous mass (2) having adsorbed therein an oxidation catalyst active at room temperature.

4 Claims, 3 Drawing Sheets

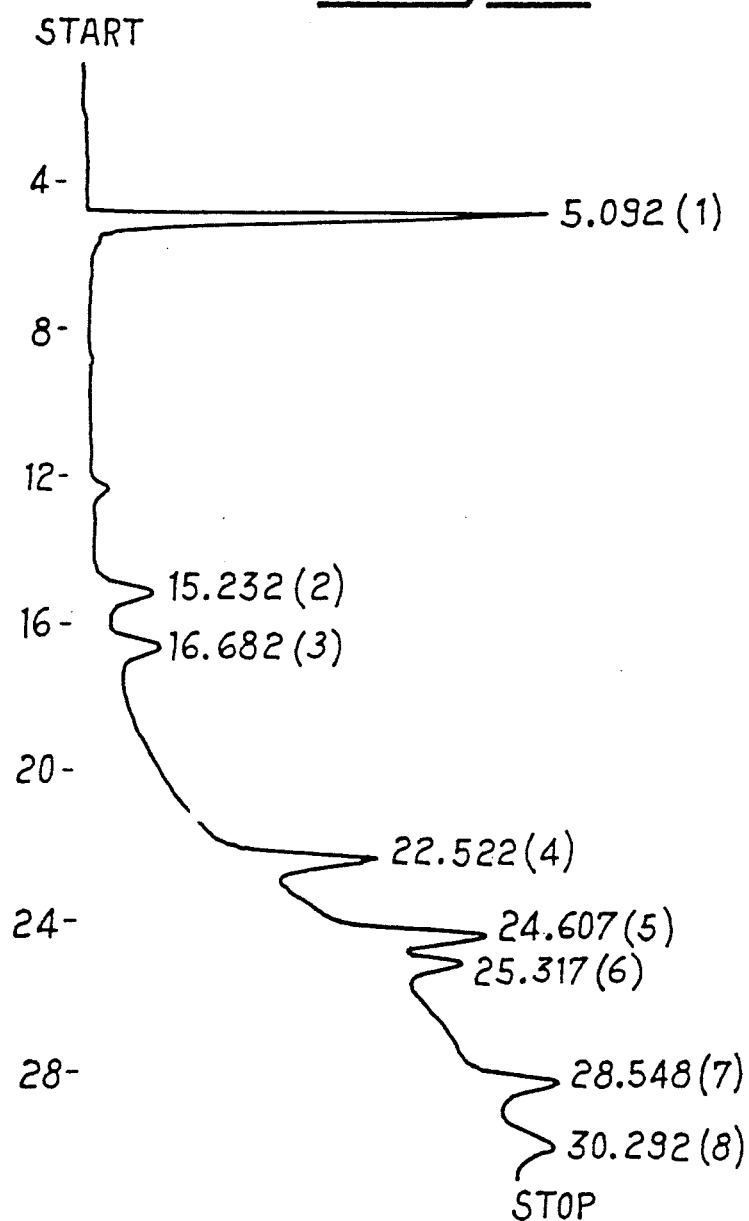

COLD OXIDATION IN GASEOUS PHASE

BACKGROUND AND FIELD OF INVENTION

In a large number of industrial processes one can observe the emission towards the atmosphere of gaseous flows containing organic solvents from painting, spraying, drying processes, furnaces and so on. The conditioning technologies available nowadays to solve this problem, since the regulations enforced by the various regional authorities state particularly low limits, may be summarized in two families:

Adsorption on Activated Carbon

It has the following drawbacks: it is impossible to find commercial activated carbons adapted to systematically adsorb different types of solvents present in the same flow;—possible desorption of a solvent already fixed in a flow which does not include it;—difficulty in regenerating said carbons with the resulting problem of their disposal as "toxic wastes";—in case said carbons get saturated with flammable solvents and problems for the/intrinsic safety of the plant itself.

Thermal After-Burning

The drawbacks experienced are the following:—it is necessary to raise the temperature of the flow by an outside fuel addition with particularly high associated operation costs;—possible formation of positively toxic chemical compounds within the flow, caused by high temperatures.

SUMMARY OF THE INVENTION

Taking the above into account, the Applicant has provided a new treatment suited to remove the above drawbacks, with the purpose of reaching the following benefits:—low operating costs measured in terms of the energy needed to destroy the solvents (by oxidation). The oxidation takes place at ambient temperature (approximately 20° C.);—approximately uniform effectiveness in the oxidation of both aromatic and aliphatic organic compounds;—no production of solid toxic wastes;—no generation of gaseous positively toxic compounds, or more toxic than the substances to be destroyed.

BRIEF DESCRIPTION OF DRAWINGS

FIG. 3 is a chromatographic representation of the concentrations of waste gases present in a sample of effluent gas after the oxidation treatment of the present invention as described in the experimental Example below.

DETAILED DESCRIPTION OF PREFERRED EMBODIMENTS

Figure 1:
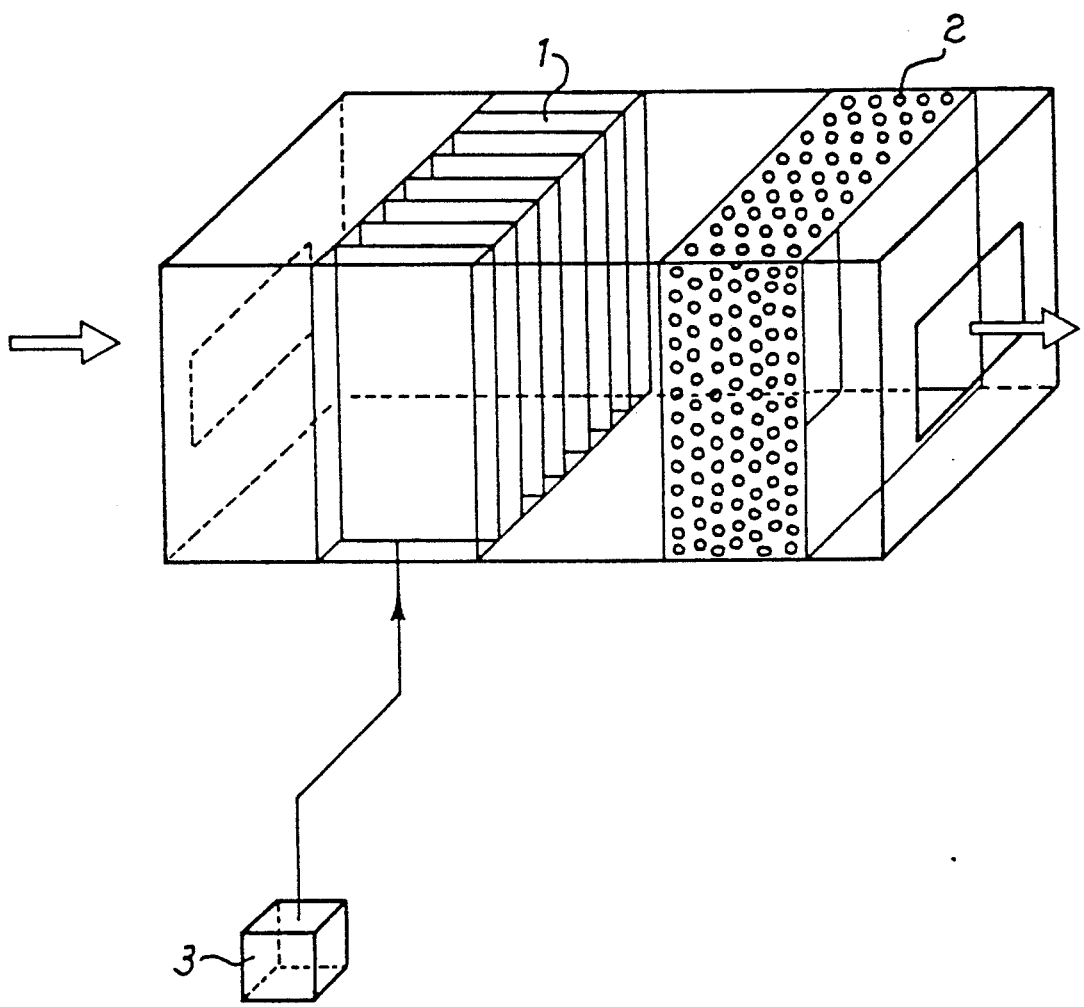
FIG. 1 is a schematic perspective view of the processing unit useful for the claimed treatment.

The gaseous matter carrying the organic solvents to be destroyed enters, at a temperature ranging from 180° C. to 40° C., the processing unit, shown schematically in the attached FIG. 1, which substantially comprises two stages:

First Stage, or Ionizing Stage

This portion substantially comprises metal plates 1 lying parallel to the flow and spaced apart from each other in such a way as to maximize the corona discharge generation. The plates are subjected to high voltages ranging from 15000 to 30000 V and from 500 to 1500 Hz in frequency, provided by a high voltage generator 3 in order to enhance the ionizing effect on the gaseous flow. The spacing between the plates is such as to get the highest possible electrical field intensity allowable for the gaseous flow subject to treatment. The plate length is related to the flow velocity, in that it determines the effective processing time. The electronic apparatus is provided with all the automatic controls and safety features necessary to make the plant operation safe and reliable.

Second Stage, or Catalytic Stage

The solvents carried by the gaseous substance undergo a first destructive treatment, while proceeding through the ionizing stage, for about 50% of the upstream contents. Free radicals are formed, in particular, which are able to develop their reactivity while contacting catalyst 2 comprised of oxides of metals such as Cr, V and metals of Group VIII, such as for instance Fe, Ni, and so on, whereby oxidation of the remaining portion takes place. The final result of this operation, if it were pushed to the extreme, would be the degradation of the solvents with production of carbon dioxide and steam. Since the cost of a plant increases exponentially versus the required efficiency, the system will be set up, with the objective of satisfying the limitations of the presently enforced law regulations, in such a way that there will still be traces of the solvent in the effluent. The results obtained by means of this equipment have been proved through laboratory research, where gas-chromatograms of the effluent were produced, in the original conditions and after processing through the system described herein. Example the laboratory tests were performed on a gaseous effluent containing xylene, toluene, butylacetate, butyl alcohol, methylisobutylketone (MIBK), methylethylketone (MEK), ethylacetate, and hexane. Tests were carried out at room temperature (about 20° C.), and the effluent processing time was approximately 1 sec (difference between inlet-outlet of the purifying unit) for a volume flowrate of 7 1/min. The gas-chromatograph used included a C20M column 6 meters long, with the following operating conditions:

starting isotherm: 12 minutes at 100° C.;
gradient: 5° C. min
final isotherm: 160° C.

Figure 2:
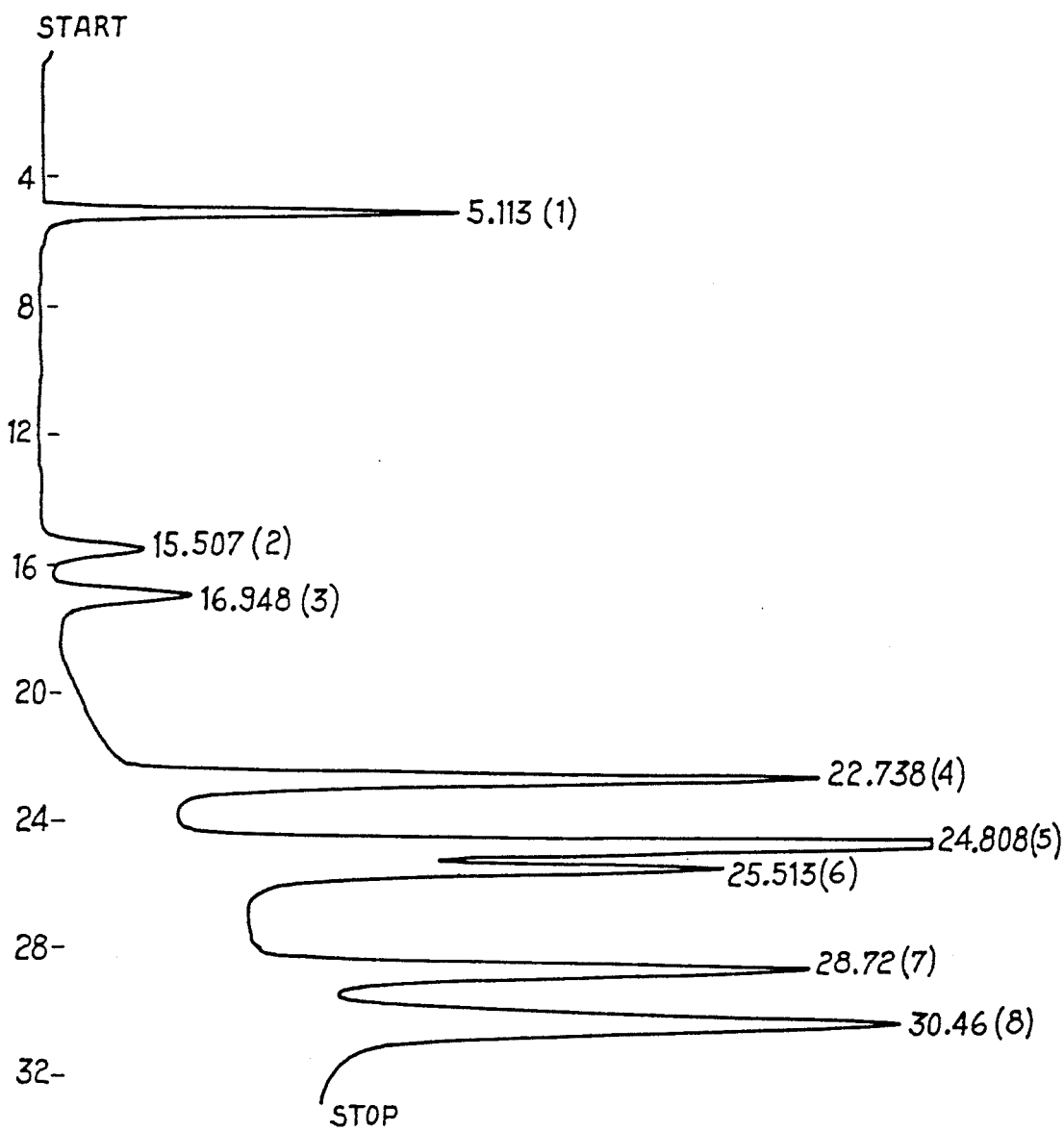
FIG. 2 is a chromatographic representation of the concentrations of waste gases present in a sample of effluent gas prior to the oxidation treatment of the present invention as described in the experimental Example below.

The chromatograms shown in FIGS. 2 and 3 are relative to the effluent before and after the oxidation treatment of this invention.

Before the Treatment (see FIG. 2)

The concentrations are listed in the following Table.

|  | PEAK NO. | TIME | AREA | CONCEN-TRAT. |
| --- | --- | --- | --- | --- |
| Hexane | 1 | 5.113 | 16423 | 5.6459 |
| Ethylacetate | 2 | 15.507 | 6735 | 2.3154 |
| Methylethylketone | 3 | 16.948 | 9418 | 3.2378 |
| Methylisobutylketone | 4 | 22.738 | 41716 | 14.341 |
| Butyl Alcohol | 5 | 24.808 | 67515 | 23.2101 |

-continued

|  | PEAK NO. | TIME | AREA | CONCEN-TRAT. |
|---|---|---|---|---|
| Butylacetate | 6 | 25.513 | 34325 | 11.8001 |
| Toluene | 7 | 28.72 | 41240 | 14.1773 |
| Xylenes | 8 | 30.46 | 73514 | 25.2724 |
| After the Treatment (see FIG. 3). | | | | |
| Hexane | 1 | 5.092 | 15041 | 34.6862 |
| Ethylacetate | 2 | 15.232 | 2977 | 6.8658 |
| Methylethylketone | 3 | 16.682 | 2718 | 6.2675 |
| Methylisobutylketone | 4 | 22.522 | 1463 | 3.3732 |
| Butyl Alcohol | 5 | 24.607 | 7200 | 16.6042 |
| Butylacetate | 6 | 25.317 | 4270 | 9.8472 |
| Toluene | 7 | 28.548 | 5232 | 12.0663 |
| Xylenes | 8 | 30.292 | 3614 | 8.3343 |

As it can be seen when comparing the height of the peaks and the extent of the related areas before and after the treatment, the quantities of organic components still present at the outlet are drastically reduced compared to the starting ones. For the tests that were performed the following reductions were obtained:

Xylenes:—95%; Toluene:—83%; Butylacetate:—87%; Butyl Alcohol:—89%; MIBK:—96%; MEK:—70%; Ethylacetate:—55%.

We claim:

1. A catalytic oxidation treatment of gaseous effluents carrying gaseous organic compounds, wherein the effluent is first made to flow at temperatures ranging from 10° C. to 40° C. between metal plates parallel to the flow direction, subjected to electrical alternate voltages ranging from 15000 to 30000V, at a frequency ranging from 500 to 1500 Hz, and the resulting ionized gas is then made to flow over supported catalysts.

2. The catalytic oxidation treatment of claim 1, wherein said gaseous organic compounds are selected from the group consisting of hexane, butyl alcohol, ethylacetate, butylacetate, methylethylketone, methylisobutylketone, toluene and xylenes.

3. The catalytic oxidation treatment of claim 2, wherein said supported catalysts are oxides of Fe, Ni, Cr and V.

4. The catalytic oxidation treatment of claim 1, wherein said supported catalysts are oxides of Fe, Ni, Cr and V.

* * * * *

UNITED STATES PATENT AND TRADEMARK OFFICE
CERTIFICATE OF CORRECTION

PATENT NO. : 5310461
DATED : May 10, 1994
INVENTOR(S) : Ernesto Bardelli and Eraldo Cassinerio It is certified that error appears in the above-indentified patent and that said Letters Patent is hereby corrected as shown below:

Column 1, line 65, "$180^{\circ}$" should read -- $18^{\circ}$ --.

Signed and Sealed this

Thirtieth Day of August, 1994

Attest:

BRUCE LEHMAN

Attesting Officer

Commissioner of Patents and Trademarks